United States Patent

[11] 3,530,758

[72] Inventor Michael J. Stillo
7674 Grennan Place, Niles, Illinois 60648
[21] Appl. No. 740,930
[22] Filed June 28, 1968
[45] Patented Sept. 29, 1970

[54] DEVICE FOR TEACHING MUSIC TO THE BLIND
2 Claims, 12 Drawing Figs.
[52] U.S. Cl. .................................................. 84/471, 84/472
[51] Int. Cl. ....................................................... G09b 15/02
[50] Field of Search ........................................... 84/470, 471, 472; 35/38, 7.3, 35.1

[56] References Cited
UNITED STATES PATENTS
| | | | |
|---|---|---|---|
| 1,433,850 | 10/1922 | Schnitker | 84/471 |
| 1,666,382 | 4/1928 | Hoffmeister | 84/471 |
| 1,879,002 | 9/1932 | Alles | 84/472X |
| 2,082,432 | 6/1937 | Von der Linden | 84/471 |
| 2,742,810 | 4/1956 | Kylin et al. | 84/471 |
| 2,770,160 | 11/1956 | Ulvad | 84/470 |
| 2,772,595 | 12/1956 | Cutlip | 84/472 |
| 2,864,275 | 12/1958 | Fraleigh | 84/471 |
| 3,228,133 | 1/1966 | Baermann | 35/7X |

Primary Examiner—Stephen J. Tomsky
Assistant Examiner—John F. Gonzales
Attorney—Hill, Sherman, Meroni, Gross and Simpson

ABSTRACT: An educational device for teaching music to the blind including a sheet of magnetized material having raised portions disposed thereon which are positioned so as to represent a musical staff for receiving discrete musical characters which can be detachably secured to the sheet and touched by the blind student during his instruction.

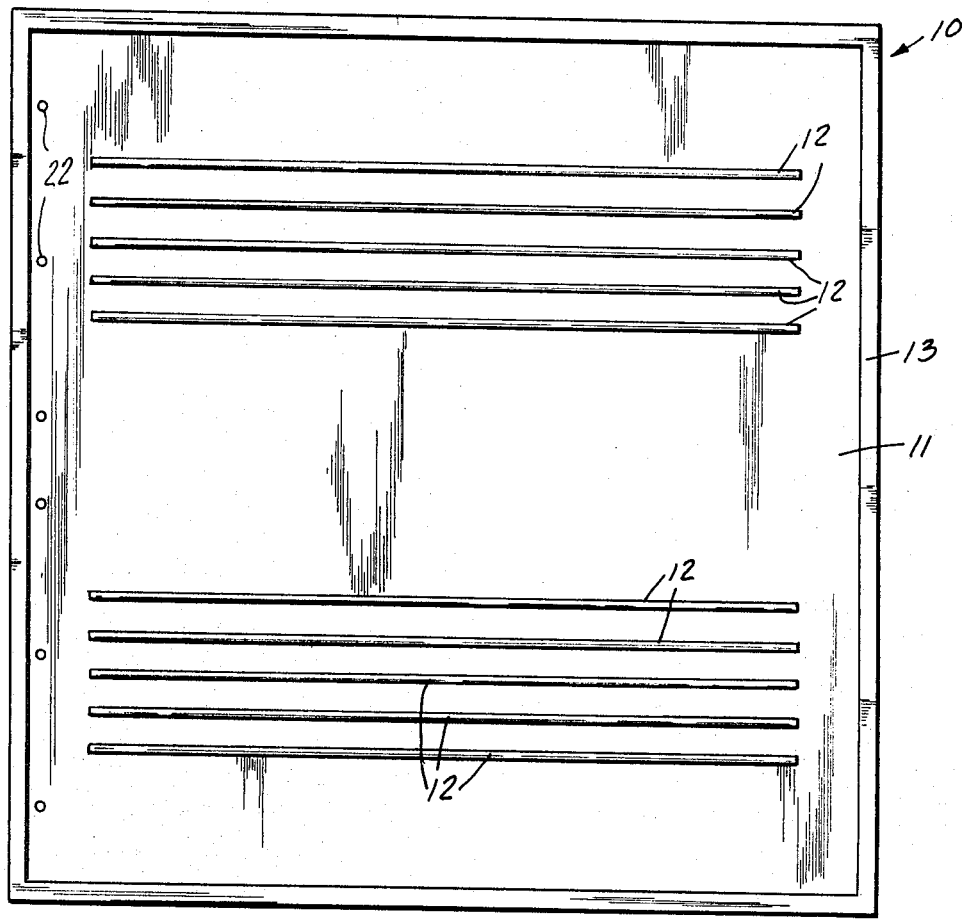
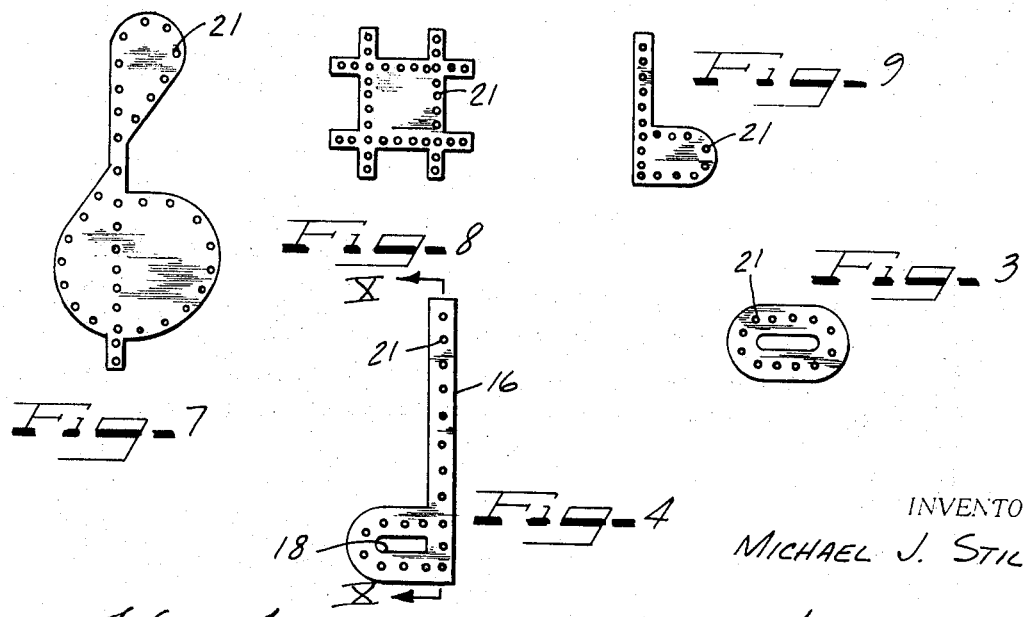

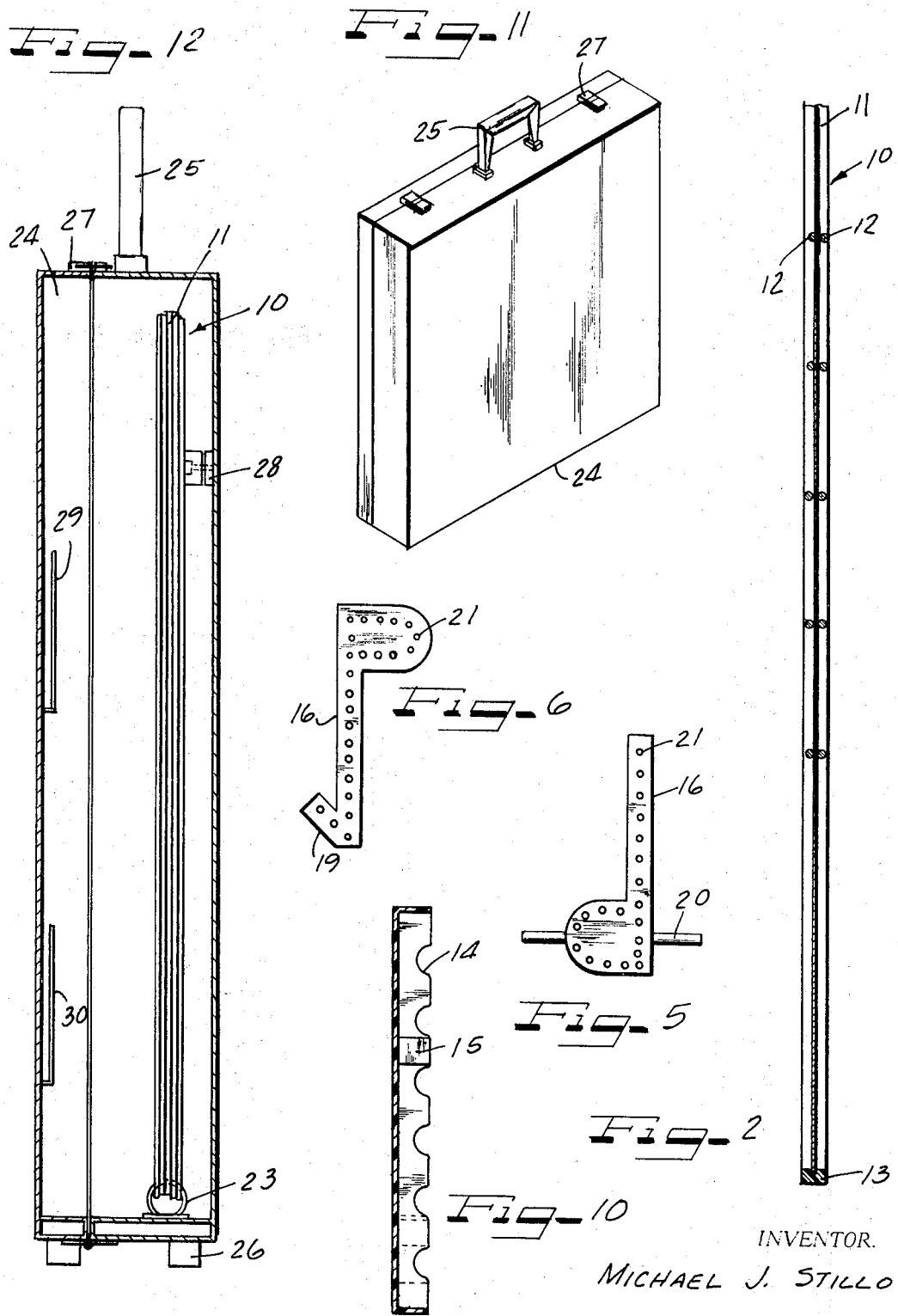

3,530,758

DEVICE FOR TEACHING MUSIC TO THE BLIND

BACKGROUND OF THE INVENTION

1. Field of the Invention

The present invention relates to a device for teaching music to the blind including datachable characters and sheets to receive them.

2. Description of the Prior Art

Prior art devices consist either of magnetized systems for positioning musical characters on a board or the positioning of musical characters by cooperating pins or lugs. The magnetized systems of the prior art however have characters which are not firmly positionable relative to the board and are not satisfactorily used for teaching the blind because systems for this purpose require firmly supported characters due to the constant touching and handling of those characters by the blind student. Further, in the prior art systems specifically designed for teaching music to the blind the characters are made stable by the use of spring arm systems and other complicated fastening means.

SUMMARY OF THE INVENTION

The present invention solves the problems of the prior art by providing magnetized sheets which have raised portions disposed thereon to form a musical staff and magnetic characters which in addition have depressions formed therein for receiving the raised portions of the staff so as to provide a means for detachably securing the characters to the sheets in a stable manner.

The use of a combination magnetic and mechanical system allows the present invention to maintain the stability required for the constant touching and handling incident to the teaching of music to a blind person.

It is therefore an object of the present invention to provide a system for teaching music to the blind in which a musical score can be copied in part or in total from a written piece of music by anyone having good sight, even one having no prior knowledge of music in a manner that can be used immediately by a blind person to learn that piece of music without the necessity of transcribing the composition into braille.

It is a further object of the present invention to provide a system for teaching music to the blind which is easily usable, is portable, and is economical.

BRIEF DESCRIPTION OF THE DRAWINGS

FIG. 1 is a plan view of the teaching device of the present invention.

FIG. 2 is a partial cross sectional view of the device of FIG. 1.

FIGS. 3 through 9 are plan views of various musical characters used in conjunction with the device of FIG. 1.

FIG. 10 is a cross sectional view along line X–X of FIG. 4.

FIG. 11 is a plan view of the carrying case of the present invention.

FIG. 12 is a cross sectional view of the carrying case of FIG. 11.

DESCRIPTION OF THE PREFERRED EMBODIMENTS

The invention relates generally to teaching apparatus and more particularly to a device for teaching music to the blind and is shown generally at numeral 10. A flexible or rigid board or sheet 11 is provided with a series of parallel rods 12 suitably secured to the sheet and formed thereon in the form of a musical staff to receive complementary detachable characters shown in FIGS. 3 through 10. Alternatively, the lines forming the staff may consist of integral protuberances extending from the plane of the backing 11.

The board or sheets 11 are made of a magnetic material such as a magnetized metal foil or a laminated structure such as that known commercially as "Magnafont" consisting of a magnetizable metal foil mounted on a magnetic backing. A border 13 may be provided for added rigidity.

The characters are formed of any rigid material such as a metal surfaced plastic or sheet metal having a plurality of dimples or recesses 14 formed therein to engage the rods 12, the diameters of the recesses 14 being substantially the same as the diameters of the rods 12. The spacing between the recesses 14 is approximately one-half the spacing between the rods 12 so that the characters can be selectively aligned with either the lines or the spaces of the staff. A plurality of recesses 14 is provided in each of the characters to allow more versatility so that the characters may be placed in more than one position on the staff with the recesses 14 engaging more than one rod 12. Magnets 15 may also be attached to the characters or formed integral therewith to aid in securing the characters with the board or sheets 11 when the characters are placed in their respectable locations.

The characters themselves are designed to have various shapes and sizes as shown in FIGS. 3 through 9. These shapes are made to represent letters, numbers, or any of the various musical notations or notes required in the writing of music. For example, the characters can be in the shape of a circle or oval which would represent a whole note as shown in FIG. 3. The characters may have a stem 16 formed thereon to represent a half note when a hole 18 is formed in the note such as in FIG. 4 or a quarter note when the note is solid as in FIG. 5. A flag 19 attached to the stem 16 would make the note an eighth note as shown in FIG. 6. The other notes can be similarly formed.

Several notes can be attached to the same stem to represent chords or a detachable raised portion or rod such as shown at 20 in FIG. 5 may be connected to the note so as to signify that the note is above or below the staff. Other special characters can represent the type of clef as indicated by the treble clef in FIG. 7 or key as represented by the sharp of FIG. 8 and flat of FIG. 9 as well as the length or rests or ties between the notes. Another modification of the invention especially useful with respect to the teaching of the blind is the possibility of forming braille or other similar notations 21 on each of the characters to facilitate the instruction. This additional aid can be formed either integrally or can be attached to the side of the characters which is to be touched by the student.

Each of the sheets can be formed with a plurality of holes 22 therein so as to allow the sheets 11 to be attached to a binder 23 similar to the standard three ring binders familiar to every student. A plurality of these standard three ring binders or some such equivalent may be attached together to provide a mechanism for holding the sheets 11 when in use. Further, a carrying case as shown at 24 can be provided to hold the binders 23 and thereby allow the sheets 11 to be moved from one location to another to facilitate portability. The case 24 itself, can be provided with a handle 25 for carrying and locks 26 at the bottom to stand the case 24 upon and when not in use as well as locking means 27 for locking the case to prevent the loss of the loose characters. Further, a block 28 can be provided within the case 24 to hold the sheets 11 straight when in use and a plurality of pockets as at 29 and 30 can also be provided for storage of the loose musical symbols, notes, letters, etc.

The method of operation is the following. While both partly and fully blind students can use this method to advance their musical careers, the beginning student by the use of this method can be taught by a music instructor who had no previous knowledge of braille. All that is required of the instructor is to place the notes on the metal sheets 11 in accordance with a musical score which can be copied from a piece of written work. The appropriate note or character then is placed on the raised staff 12 in the exact position on which it appears in the score. The student then touches the raised staff 12 and notes to identify the character and its position on the staff. After several lessons, when the student has memorized the positions of the notes on the staff, the notes may be removed from the metal sheets 11 and replaced and replaced with another lesson.

The fully blind person who has had some previous experience with braille can convert to this method very easily.

He can read from a braille book, and transfer the braille notes to the metal sheets 11. The raised dots 21 on the characters whether in the form of standard braille notation or in the shape of the notes will be readily familiar to an individual skilled in braille reading and he will have no difficulty in identifying the symbols of music so as to allow him to learn the particular number presented. Thus, the music of the song can be learned long before any opportunity can be had by this particular blind student to obtain the same music written out in the usual braille form. This gives the blind student the advantage of learning popular music at a time when he is most desirous of doing so. The complete melody can be copied at once within a matter of minutes, by any member of the family or anyone who has sight even if that person has no knowledge of music, or a part of the melody can be copied and once learned, can be removed from the sheets and replaced with a subsequent part of the melody to be learned at a future time, thereby providing both a versatile and worthwhile teaching aid.

It will be understood that many variations and modifications may be effected without departing from the scope of the novel concepts of this invention.

I claim:

1. An educational device for teaching music comprising a flat magnetized base formed with a plurality of spaced parallel protuberances defining a musical staff, and characters representing musical symbols, the undersides of said characters having non-clamping recesses therein complementary to the shape and spaced apart a distance equal to that of said protuberances to thereby enable said characters to engage said protuberances in close fitting relation, a portion at least of the surface of each of said characters having sufficient magnetic permeability to enable said base to hold the character against said protuberances in a preselected position on said staff.

2. The device of claim 1 in which said characters have raised dots on the face thereof providing braille indicia identifying said character by touch.